(12) United States Patent
Cheng

(10) Patent No.: US 11,266,938 B2
(45) Date of Patent: Mar. 8, 2022

(54) ASSEMBLED AIR CLEANER

(71) Applicant: San Ford Machinery Co., Ltd., Taichung (TW)

(72) Inventor: Yuan-Tai Cheng, Taichung (TW)

(73) Assignee: SAN FORD MACHINERY CO., LTD., Taichung (TW)

( * ) Notice: Subject to any disclaimer, the term of this patent is extended or adjusted under 35 U.S.C. 154(b) by 275 days.

(21) Appl. No.: 16/594,453

(22) Filed: Oct. 7, 2019

(65) Prior Publication Data
US 2021/0101102 A1    Apr. 8, 2021

(51) Int. Cl.
*B01D 46/00* (2006.01)
*B01D 46/10* (2006.01)

(52) U.S. Cl.
CPC ..... *B01D 46/0013* (2013.01); *B01D 46/0024* (2013.01); *B01D 46/0041* (2013.01); *B01D 46/10* (2013.01)

(58) Field of Classification Search
CPC .............. B01D 46/0013; B01D 46/10; B01D 46/0024; B01D 2273/30; A62B 7/08
USPC ......... 55/356, 472, 480, 481, 485, 490, 493, 55/506; 96/15, 68, 233, 422; 422/121, 422/122, 177, 186.04
See application file for complete search history.

(56) References Cited

U.S. PATENT DOCUMENTS

| | | | | |
|---|---|---|---|---|
| 4,801,382 A | * | 1/1989 | Kemmelmeyer | B01D 25/26 210/323.1 |
| 7,531,141 B2 | * | 5/2009 | Descotes | F24F 7/007 422/121 |
| 2012/0170009 A1 | * | 7/2012 | Katsura | B01D 53/0415 355/30 |
| 2014/0020561 A1 | * | 1/2014 | Aery | B01D 46/2411 96/224 |

* cited by examiner

*Primary Examiner* — Minh Chau T Pham
(74) *Attorney, Agent, or Firm* — Sinorica LLC

(57) ABSTRACT

An assembled air cleaner includes an air blowing box, a plurality of first filter boxes that is stacked in a vertical direction and disposed above the air blowing box, and an air inlet box disposed on top of the topmost first filter box. At least one filter is provided inside the first filter boxes. Each first filter box has a bottom wall and a flange protruding upwardly around a peripheral edge of the bottom wall. The flange is configured to hold against a bottom of the filter in an airtight manner. A plurality of airtight members is provided on each first filter box and can be pressed against the filter, thereby improving filtering and dust collection effects greatly.

5 Claims, 9 Drawing Sheets

ASSEMBLED AIR CLEANER

FIELD OF THE INVENTION

The present invention relates to a dust collector, and more particularly to an assembled air cleaner capable of maintaining good airtightness of first filter boxes that are stacked vertically, thereby improving filtering and dust collection effects greatly.

BACKGROUND OF THE INVENTION

In general, in the workplace where gas or dust harmful to the human body is generated, a dust collector is usually used for air purification to reduce the harm to the human body. A conventional dust collector includes an airtight housing and a plurality of filters having a filtering effect disposed inside the air airtight housing. An air blower capable of generating a vacuum suction force is disposed on the bottom of the dust collector. The top of the dust collector is provided with an air inlet for introducing dirty air or dust from the outside. When the air blower is started, its suction force allows dirty air or dust to be introduced into the dust collector from the air inlet. After filtering through the filters, clean air can be discharged to the outside. Although the above dust collector can filter dirty air or dust, the number and type of filters will vary depending on the working conditions. Since the conventional dust collector is an integrated closed design, it cannot be adjusted and changed according to different working conditions. Therefore, a dust collector with an assembled design is developed accordingly.

A conventional assembled dust collector is mainly composed of an air blower, filters, an air inlet, and so on. These components are mounted in boxes with the same size and assembled with each other. The user can select a desired number of first filter boxes to form a large-sized or small-sized dust collector according to different needs. Or, the user selects first filter boxes mounted with different filters to match each other to form a multi-purpose dust collector. The assembled dust collector provides a better filtering effect according to different working conditions. Although the above-mentioned assembled dust collector can be assembled as desired, it still has its disadvantages. That is, when a plurality of first filter boxes are assembled and stacked vertically, there is a gap between every two of the filter boxes. When the dust collector is running, the gas or dust inside the dust collector may overflow and leak to the outside through the gap. As a result, the use of the dust filter is not as expected, not meeting the filtration quality requirements of a high specification. The filtering effect is not as good as the dust collector having the traditional closed housing.

Accordingly, the inventor of the present invention has devoted himself based on his many years of practical experiences to solve these problems.

SUMMARY OF THE INVENTION

The primary object of the present invention is to provide an assembled air cleaner, comprising an air blowing box, a plurality of first filter boxes that are stacked in a vertical direction and disposed above the air blowing box, and an air inlet box disposed on top of the topmost first filter box. An air blower capable of generating a vacuum suction force is disposed inside the air blowing box. Each first filter box is a hollow box to form an accommodating room therein. The accommodating room is configured to accommodate at least one filter. An air inlet is disposed at an outer side of the air blowing box. Each first filter box has a bottom wall extending horizontally and inwardly from a peripheral edge of a bottom thereof. A closed flange protrudes upwardly around a peripheral edge of the bottom wall. The flange is configured to hold against a bottom of the filter in an airtight manner A plurality of engaging seats are symmetrically disposed around an inner wall of each first filter box. A plurality of airtight members made of an elastically deformable material are slideably disposed on the engaging seats of each first filter box, respectively. Each airtight member includes a top surface that can be pressed down by the bottom wall of the upper first filter box and a bottom surface that can be pressed against the filter inside the first filter box. A plurality of fastening units are disposed on the air blowing box, the first filter boxes and the air inlet box, respectively. Each fastening unit includes an upper fastening member and a lower fastening member. The upper fastening members of the fastening units are disposed on upper sections of outer walls of the air blowing box, the first filter boxes and the air inlet box. The lower fastening members of the fastening units are disposed on lower sections of the outer walls of the air blowing box, the first filter boxes and the air inlet box to be fastened by the corresponding upper fastening members.

Preferably, each engaging seat has an engaging groove extending downwardly from its top edge. Each airtight member includes an engaging portion that is moveably fitted in the engaging groove.

Preferably, each first filter box is provided with a plurality of positioning blocks respectively connected to the engaging seats. The bottom wall of the upper first filter box is formed with positioning holes corresponding in position to the positioning blocks.

Preferably, one of the fastening units is disposed between the air blowing box and an adjacent one of the first filter boxes as a connecting means.

Preferably, one of the fastening units is disposed between the air blowing box and the first filter box adjacent to the air blowing box as a connecting means.

Preferably, one of the fastening units is disposed between the air inlet box and the first filter box adjacent to the air inlet box as a connecting means.

Preferably, wherein a second filter box is provided under the air blowing box. Another filter is mounted inside the second filter box to collect dust for the air blower.

Preferably, another fastening unit is provided between the air blowing box and the second filter box as a connecting means.

DETAILED DESCRIPTION OF THE PREFERRED EMBODIMENTS

Figure 1:
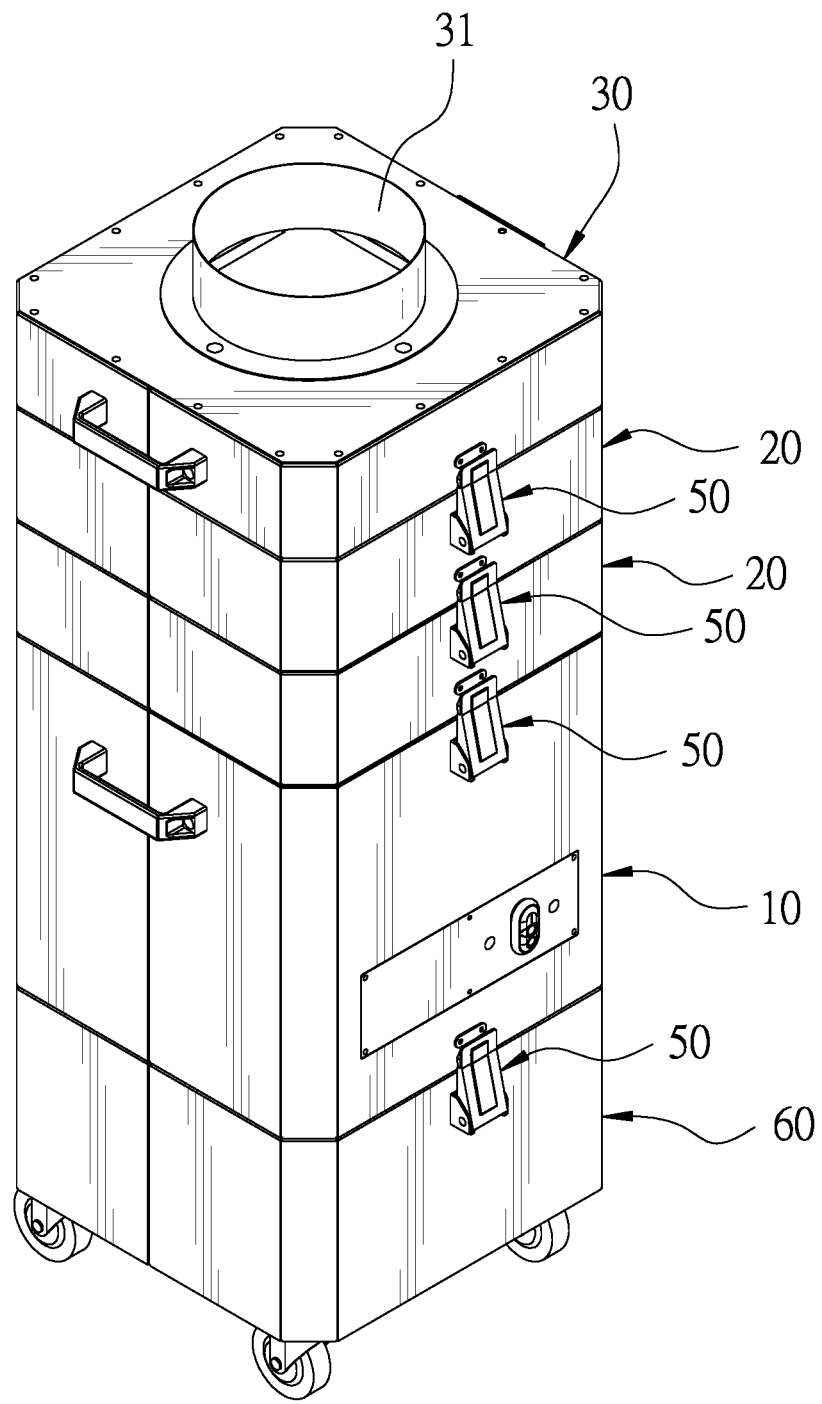
FIG. 1 is a perspective view according to a preferred embodiment of the present invention.
Figure 2:
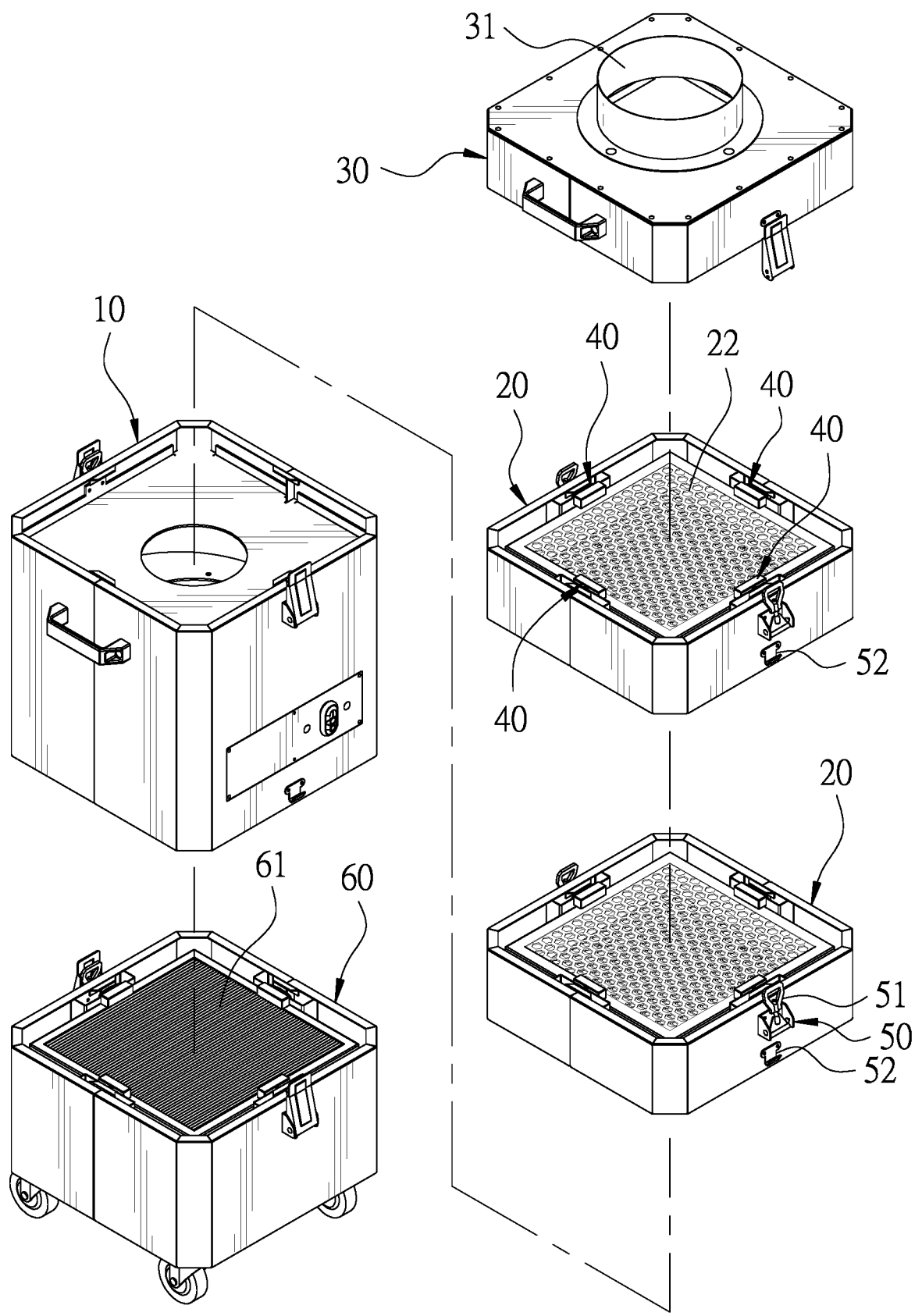
FIG. 2 is an exploded view according to the preferred embodiment of the present invention, illustrating that the present invention comprises an air blowing box, a plurality of first filter boxes, an air inlet box, a plurality of fastening units and a second filter box, wherein each fastening unit includes an upper fastening member and a lower fastening member.
Figure 3:
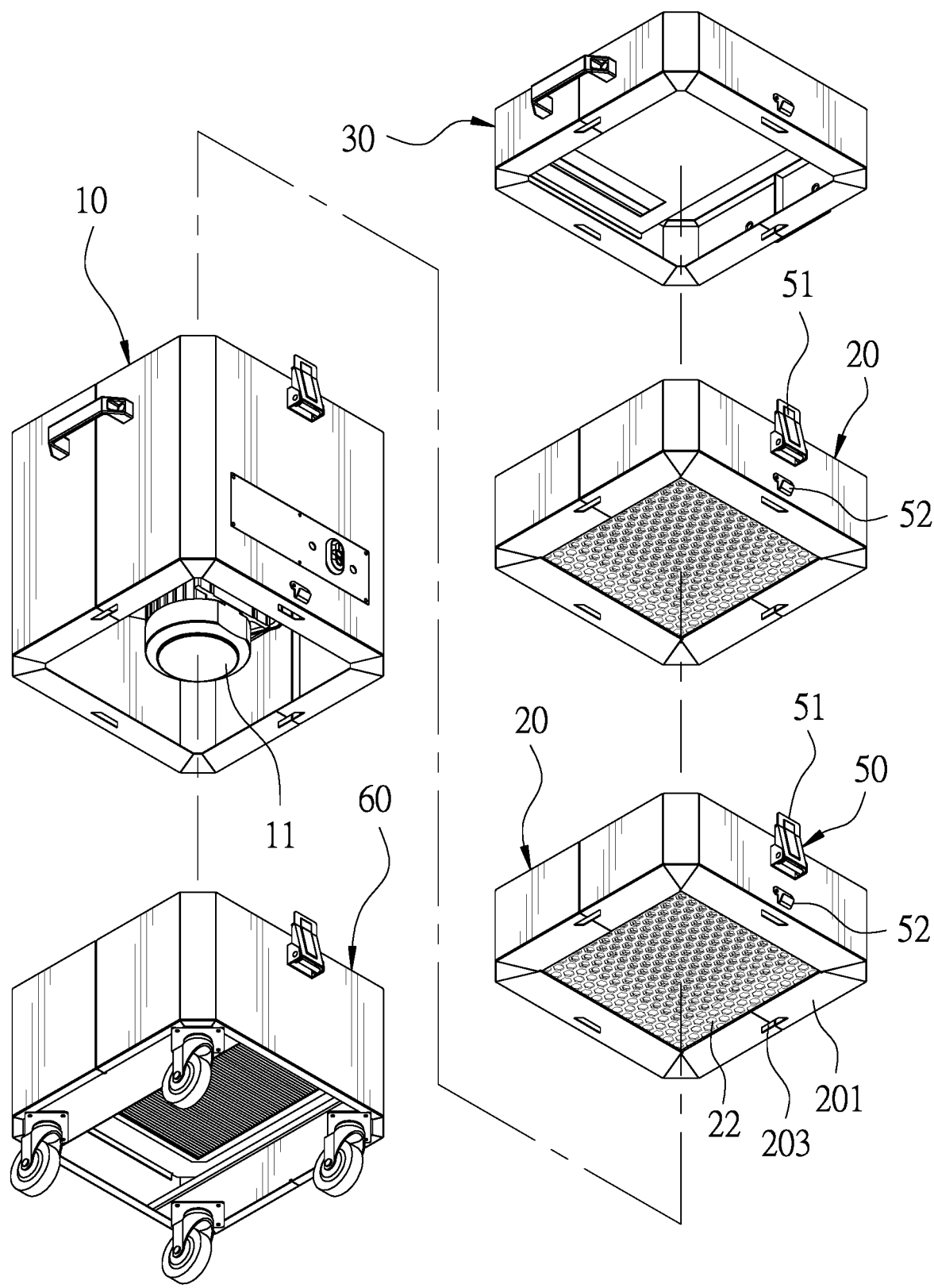
FIG. 3 is an exploded view of the preferred embodiment of the present invention, illustrating the parts of the present invention seen from the bottom.
Figure 4:
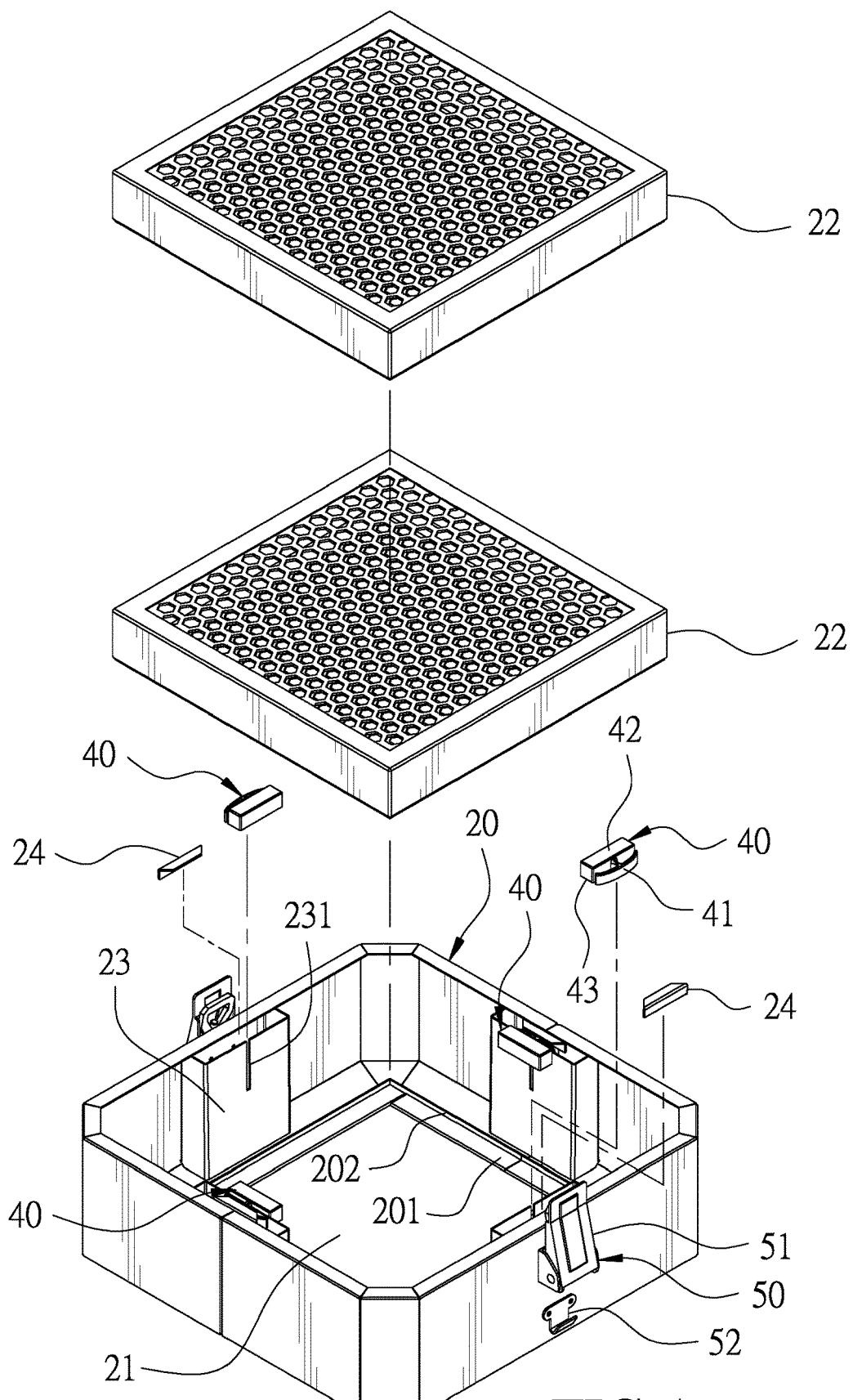
FIG. 4 is an exploded view according to the preferred embodiment of the present invention, illustrating that two filters are provided in the first filter box, a plurality of engaging seats are provided on the inner wall of the first filter box, and a plurality of airtight members capable of pressing the edge of the filter are disposed on the engaging seats, respectively.
Figure 5:
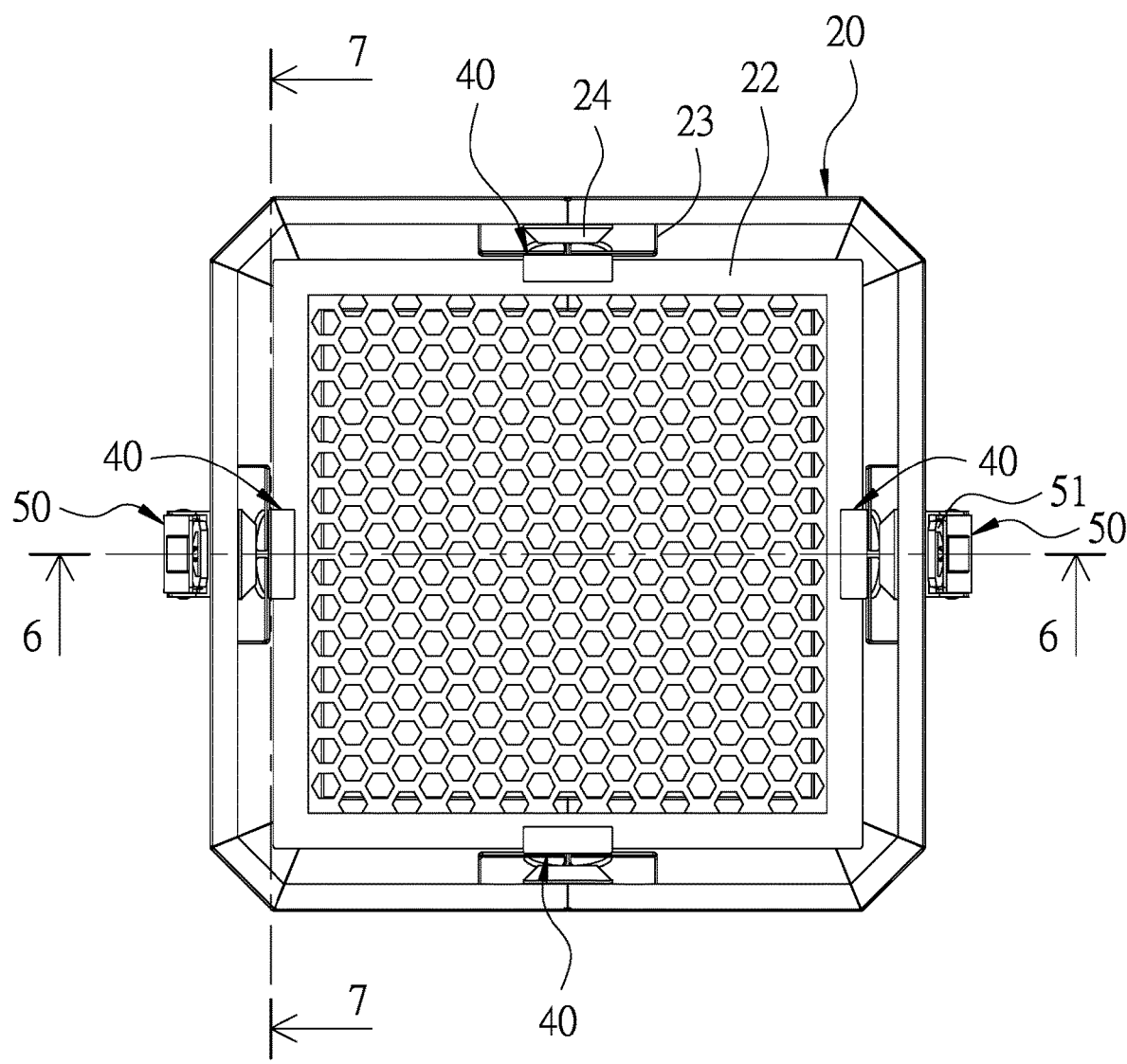
FIG. 5 is a top view of the first filter box according to the preferred embodiment of the present invention.
Figure 6:
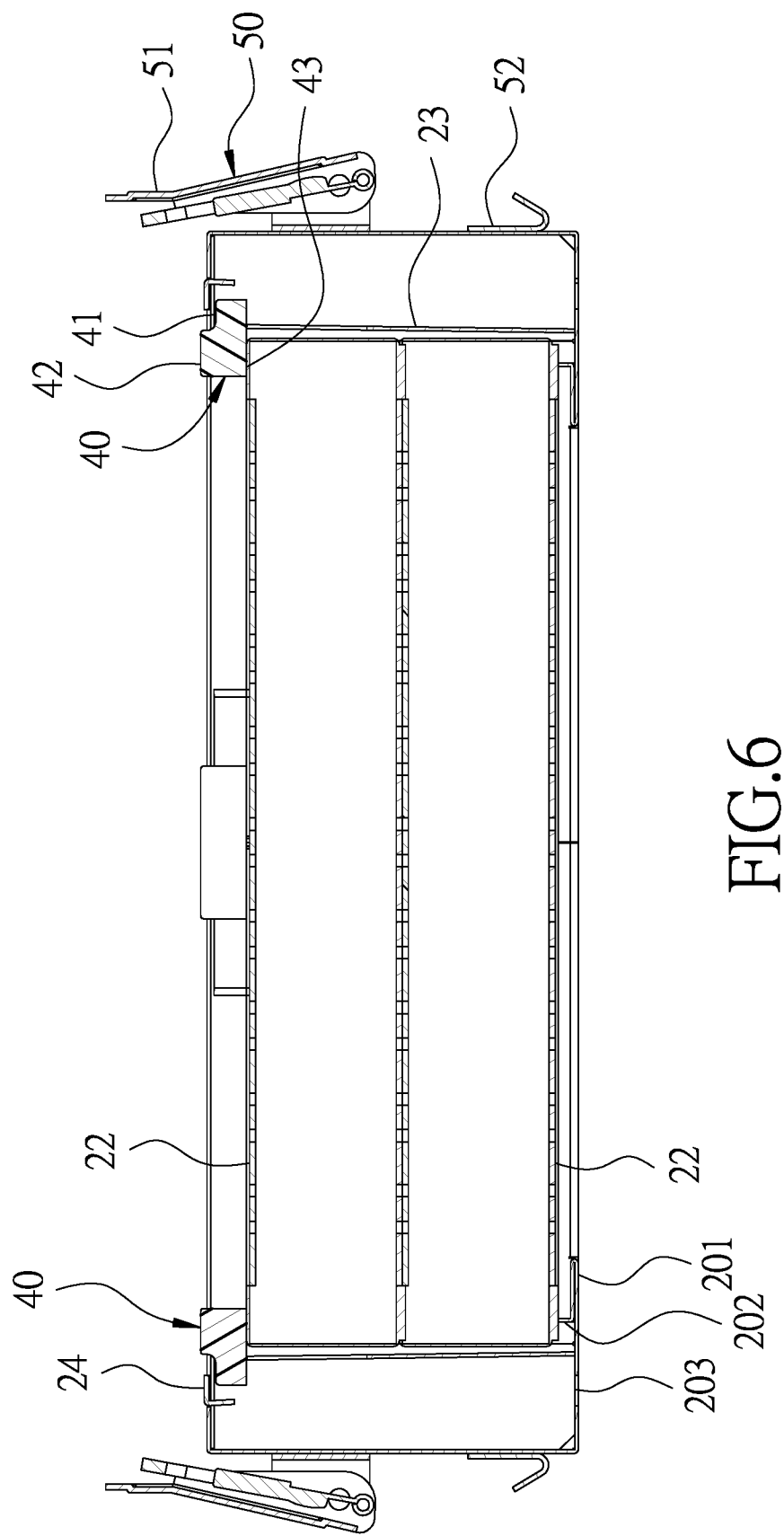
FIG. 6 is a sectional view taken along line 6-6 of FIG. 5, illustrating that the bottom wall of the first filter box is provided with a protruding flange to lean against the bottom of the filter in an airtight manner.
Figure 7:
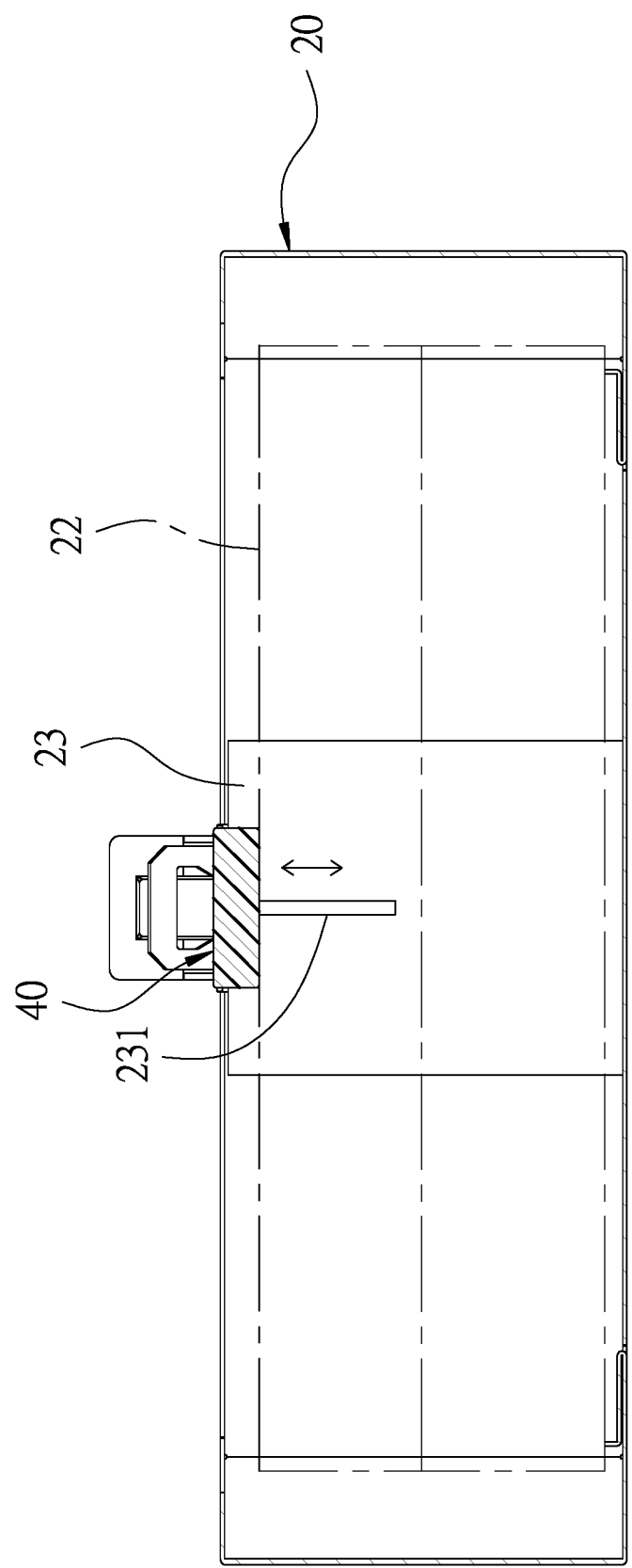
FIG. 7 is a sectional view taken along line 7-7 of FIG. 5, illustrating that the engaging seat has an engaging groove extending downwardly from its top edge, wherein the airtight member is slideably connected to the engaging groove so that the airtight member can be pressed against the filter.

Embodiments of the present invention will now be described, by way of example only, with reference to the accompanying drawings.

Referring to FIG. 1 through FIG. 7, an assembled air cleaner according to a preferred embodiment of the present invention mainly comprises an air blowing box 10, a plurality of first filter boxes 20 that are stacked in a vertical direction and disposed above the air blowing box 10, and an air inlet box 30 disposed on top of the topmost first filter box 20. An air blower 11 capable of generating a vacuum suction force is disposed inside the air blowing box 10. An air inlet 31 is disposed at an outer side of the air blowing box 10. Each first filter box 20 is a hollow box to form an accommodating room 21 therein. In this embodiment, the accommodating room 21 is configured to accommodate two filters 22. The filter 22 may be a high-efficiency particulate air filter (HEPA) or activated carbon filter, so that the air passing through the filter 22 can achieve various effects such as purification, filtration, deodorization and the like. This filtering effect is especially suitable for laser cutting or laser engraving. In general, laser cutting or laser engraving usually uses high-energy laser light to burn objects, such as metal, wood, leather, etc., which is easy to generate harmful gases and dust to the human body during machining. This invention can keep the air cleaning in the workplace where a laser cutting or laser engraving machine is used. The main feature of this invention is described below.

The first filter boxes 20 are all of a uniform size and substantially rectangular shape. Each first filter box 20 has a bottom wall 201 extending horizontally and inwardly from the peripheral edge of the bottom of the first filter box 20. A closed flange 202 having a rectangular shape protrudes upwardly around the peripheral edge of the bottom wall 201. The flange 202 is configured to hold against the bottom of the filter 22 in an airtight manner A plurality of engaging seats 23 are symmetrically disposed around the inner wall of each first filter box 20. Each engaging seat 23 has an engaging groove 231 extending downwardly from its top edge. Each first filter box 20 is provided with a plurality of trapezoidal positioning blocks 24 respectively connected to the engaging seats 23. The bottom wall 201 is formed with positioning holes 203 corresponding in position to the positioning blocks 24. When the upper and lower two first filter boxes 20 are stacked and assembled, the positioning blocks 24 are just fitted into the positioning holes 203 of the upper first filter box 20, so that the first filter boxes 20 can be positioned and assembled quickly.

The assembled air cleaner further comprises a plurality of airtight members 40 made of an elastically deformable material (for example, rubber) and disposed on the engaging seats 23 of each first filter box 20, respectively. Each airtight member 40 includes an engaging portion 41 that is fitted in the engaging groove 231 and can be moved up and down, a top surface 42 that slightly extends out of the top of the first filter box 20 and can be pressed down by the bottom wall 201 of the upper first filter box 20, and a bottom surface 43 that can be pressed against the filter 22 inside the first filter box 20.

The assembled air cleaner further comprises a plurality of fastening units 50. Each fastening unit 50 includes an upper fastening member 51 and a lower fastening member 52. In this embodiment, the upper fastening member 51 is a handle having a buckle ring, and is disposed on the upper section of the outer wall of the first filter box 20. The user can directly press the upper fastening member 51 with his/her hand. The lower fastening member 52 is a J-shaped hook, and is disposed on the lower section of the outer wall of the first filter box 20 to be fastened by the corresponding upper fastening member 51.

The assembled air cleaner further comprises a second filter box 60. The second filter box 60 is disposed under the air blowing box 10. A filter 61 is mounted inside the second filter box 60. The filter 61 is configured to perform dust removal for the air blower 11 (especially the motor) inside the air blowing box 10. Compared with the conventional dust collector not having a dust removal design for the air blower that is easily accumulated with dust, the present invention has the second filter box 60 to improve the cleaning and filtering effect of the overall dust collector.

The present invention adopts an assembled design. In addition to the fastening unit 50 as the connection between every two of the first filter boxes 20, the fastening unit 50 as a connecting means is also provided between the air blowing box 10 and the first filter box 20 adjacent to the air blowing box 10, between the air inlet box 30 and the first filter box 20 adjacent to the air inlet box 30, and between the air blowing box 10 and the second filter box 60. The assembly is quick and the operation is simple, so that the airtightness between the boxes of the present invention can be maintained in an optimal state.

The above is an overview of the main components and combination of the assembled air cleaner of the present invention. Next, the use and the expected effects of the present invention are described below.

Figure 8:
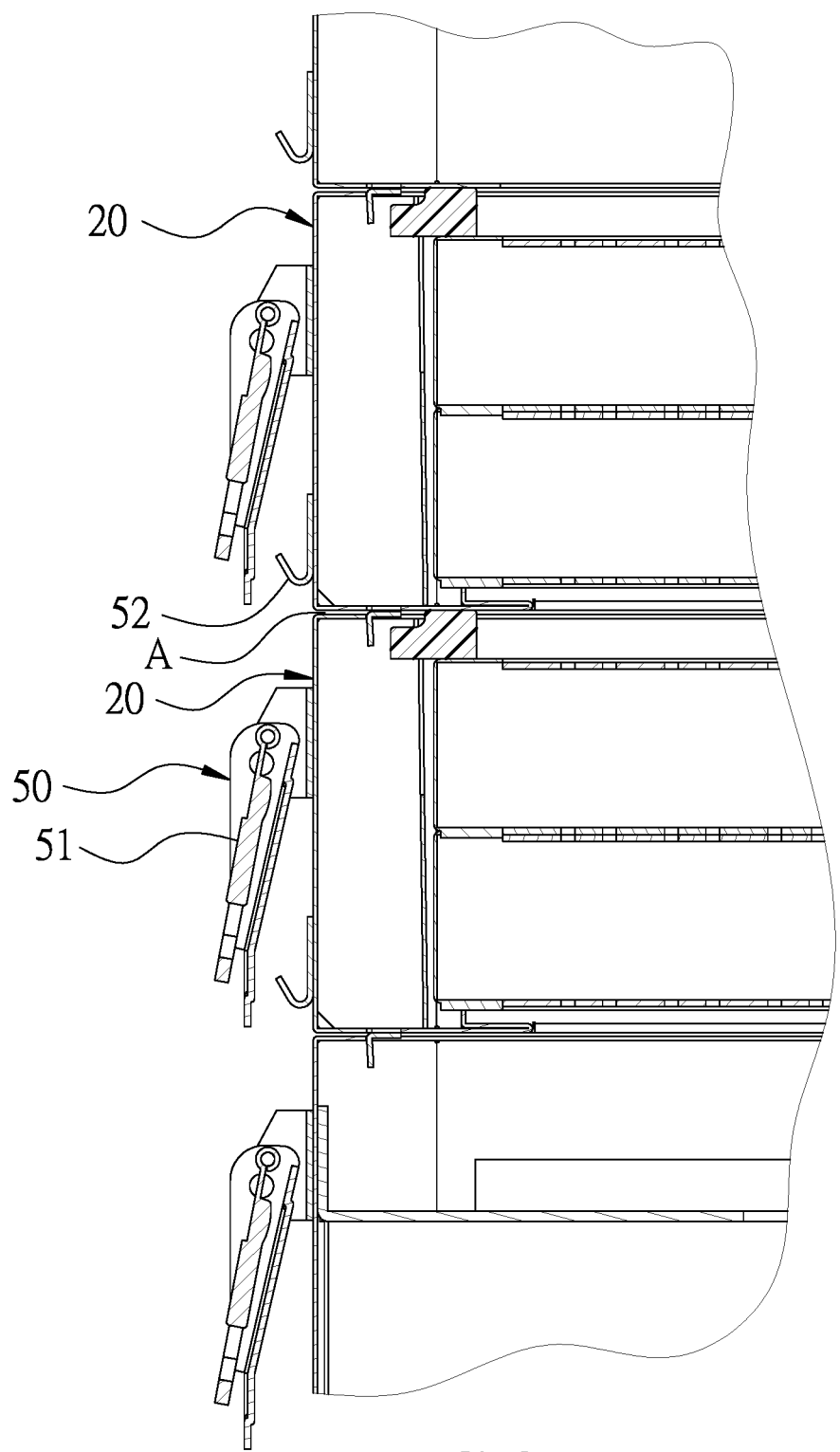
FIG. 8 is a schematic view according to the preferred embodiment of the present invention, illustrating that the upper and lower first filter boxes are stacked in the vertical direction, wherein when the upper and lower fastening members are not engaged with each other, a gap is formed between every two of the first filter boxes.

Referring to FIG. 8, in use, the first filter boxes 20 are stacked in the vertical direction. When the upper and lower fastening members 51, 52 are separate from each other (not engaged with each other), the first filter boxes 20 are only pressed by their own weights, and a gap A is formed between every two of the first filter boxes 20.

Figure 9:
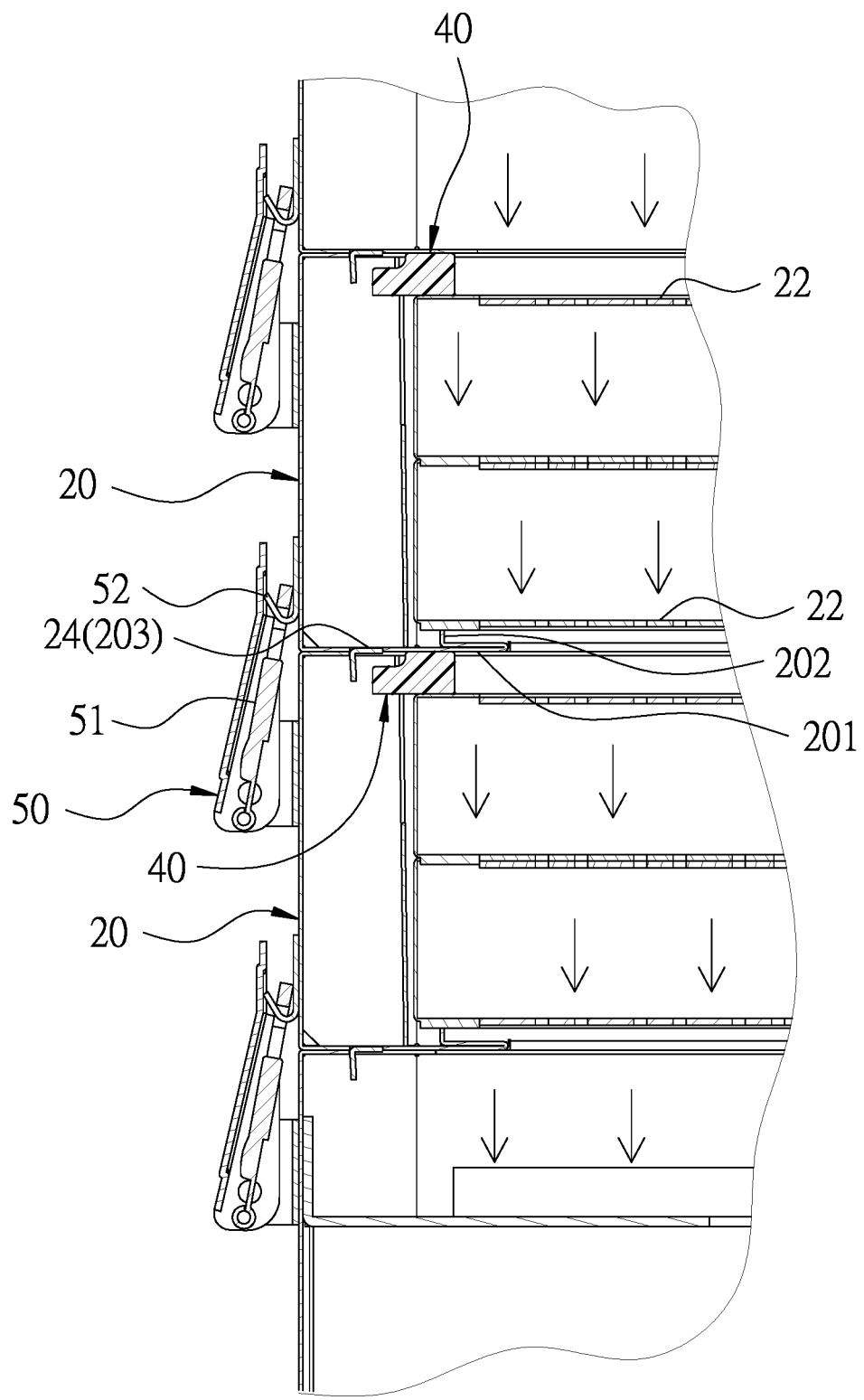
FIG. 9 is a schematic view according to the preferred embodiment of the present invention, illustrating that after the upper and lower fastening members are fastened together, every two of the first filter boxes are forced to clamp each other so as to eliminate the gap, the airtight members are pressed by the upper first filter box to press the filter downward, the bottom of the filter is pressed against the flange to be in an airtight state, and the dust introduced into the first filter box is filtered through the filter.

Referring to FIG. 9, the user can hook the upper fastening member 51 of the lower first filter box 20 to the lower fastening member 52 of the upper first filter box 20. When the upper and lower fastening members 51, 52 are engaged with each other and pressed down to apply a force to clamp the two first filter boxes 20 tightly, thereby eliminating the gap A between the two first filter boxes 20. The positioning blocks 24 of the lower first filter box 2 are engaged in the positioning holes 203 of the upper first filter box 20. At this time, the airtight members 40 are pressed by the bottom wall 201 of the upper first filter box 20, and the airtight members 40 simultaneously presses the filters 22 downwardly. The bottom of the lower filter 22 is kept airtight by the entire flange 202 of the first filter box 20, so that the dust introduced into the first filter box 20 can only pass through the filter 22, without going out of the first filter box 20.

In summary, the assembled air cleaner of the present invention is to solve the problem that the conventional assembled air cleaner has poor airtightness due to the combination of the boxes, resulting in poor filtration efficiency. The technical solution of the present invention is to provide a plurality of fastening units 50 on the outsides of each first filter box 20, the air inlet box 30, the air blowing box 10 and the second filter box 60. Each fastening unit 50 includes an upper fastening member 51 and a lower fastening member 52. The upper fastening member 51 of the lower box can fasten the lower fastening member 52 of the upper box tightly, so that the gap between every two boxes can be eliminated, and the entire dust collector can maintain good airtightness. Another feature of the present invention is that the bottom of the first filter box 20 is provided with a closed surrounding flange 202. The flange 202 is configured to hold against the bottom of the filter 22, providing an airtight effect. Besides, a plurality of airtight members 40 are slidably disposed on the inner wall of the first filter box 20. When every two first filter boxes 20 are stacked and assembled, the airtight members 40 are pressed by the upper first filter box 20 to elastically press the filters 22 downward, so that the dust introduced into the first filter box 20 can only pass through the filter 22 for filtration, without going out of the first filter box 20. Thereby, the invention can improve dust filtration greatly and achieve the filtration quality of a higher standard.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An assembled air cleaner, comprising:
an air blowing box;
a plurality of first filter boxes that is stacked in a vertical direction and disposed above the air blowing box;
an air inlet box disposed on top of the topmost first filter box;
an air blower capable of generating a vacuum suction force being disposed inside the air blowing box, each first filter box being a hollow box to form an accommodating room therein, the accommodating room being configured to accommodate at least one filter, an air inlet being disposed at an outer side of the air blowing box,
wherein each first filter box has a bottom wall extending horizontally and inwardly from a peripheral edge of a bottom thereof, a closed flange protrudes upwardly around a peripheral edge of the bottom wall, the flange is configured to hold against a bottom of the filter in an airtight manner, a plurality of engaging seats is symmetrically disposed around an inner wall of each first filter box,
wherein a plurality of airtight members made of an elastically deformable material is slidably disposed on the engaging seats of each first filter box respectively, each airtight member includes a top surface that can be pressed down by the bottom wall of the upper first filter box and a bottom surface that can be pressed against the filter inside the first filter box,
wherein a plurality of fastening units is disposed on the air blowing box, the first filter boxes and the air inlet box respectively, each fastening unit includes an upper fastening member and a lower fastening member, the upper fastening members of the fastening units are disposed on upper sections of outer walls of the air blowing box, the first filter boxes and the air inlet box, and the lower fastening members of the fastening units are disposed on lower sections of the outer walls of the air blowing box, the first filter boxes and the air inlet box to be fastened by the corresponding upper fastening members,
wherein each engaging seat has an engaging groove extending downwardly from its top edge, and each airtight member includes an engaging portion that is moveably fitted in the engaging groove, and
wherein each first filter box is provided with a plurality of positioning blocks respectively connected to the engaging seats, and the bottom wall of the upper first filter box is formed with positioning holes corresponding in position to the positioning blocks.

2. The assembled air cleaner as claimed in claim 1, wherein one of the fastening units is disposed between the air blowing box and the first filter box adjacent to the air blowing box.

3. The assembled air cleaner as claimed in claim 1, wherein one of the fastening units is disposed between the air inlet box and the first filter box adjacent to the air inlet box.

4. The assembled air cleaner as claimed in claim 1, wherein a second filter box is provided under the air blowing box, and another filter is mounted inside the second filter box to collect dust for the air blower.

5. The assembled air cleaner as claimed in claim 4, wherein another fastening unit is provided between the air blowing box and the second filter box.

* * * * *